Patented Aug. 4, 1942

2,292,011

UNITED STATES PATENT OFFICE 2,292,011

PROCESS FOR THE PREPARATION OF LIGHTWEIGHT PRODUCTS

Joseph R. Parsons, Chicago, Ill., assignor to United States Gypsum Company, Chicago, Ill., a corporation of Illinois No Drawing. Application October 6, 1938, Serial No. 233,518

3 Claims. (Cl. 106—40)

This invention relates to an insulating material, and more particularly to a lightweight ceramic product and a process for producing the same.

It has long been the object of manufacturers in the ceramic industry to produce lightweight cellular ceramic products which are suitable for use as insulating materials and also have sufficient strength to permit them to be used in practically all types of building constructions. A large number of methods for producing the desired cellularity within such products have been proposed. For example, it has been proposed to incorporate wood fibers or a volatilizable material, such as naphthalene, directly into the clay slip or suspension previous to the molding and drying of the pressed product. These extraneous materials are expelled from the resulting product during the firing operation, leaving voids within. The resulting material consequently consists of a ceramic mass having a plurality of cellular spaces formed by the removal of the combustible or volatile material from the interior during the firing operation. It has also been proposed in the past to incorporate a gaseous foam directly into the clay slip or wet clay mass previous to the molding or shaping thereof. The voids in the ceramic product produced by this method are formed by the air bubbles of the foam which are surrounded by the argillaceous material. It has also been proposed to introduce gas-forming materials, such as acids and carbonates, directly into the cementitious mass and allow the gas cells to form in situ.

The introduction of cell-forming substances such as foam into the clay slip, however, has necessitated in the past the simultaneous incorporation of a stiffening agent in order to cause the argillaceous material to set up after having been formed, but previous to drying. This has been necessary in order to prevent the relatively wet mass from slumping and losing its form. Stiffening agents that have been employed for this purpose have been plaster of Paris, Portland cement, and the like. However, these materials are somewhat undesirable in the resulting product, since during the firing of the mass they have a tendency to become dehydrated and adversely affect the formation of a strong ceramic bond within the mass.

It has been particularly desirable in the manufacture of lightweight ceramic products from a clay slip and foam to incorporate such stiffening agents. The clay slip is usually mobile and liquid in order that the foam may be readily and thoroughly incorporated therewith. The resulting mass consequently contains a large percentage of water which must be dried from the material preliminary to firing. The masses during the drying operation have a tendency to shrink and warp to a considerable extent. It is believed that this is due, at least partially, to the large amount of water present within the material.

One object of this invention is the provision of an insulating material which may be prepared with a minimum amount of water.

A further object of this invention is to provide a method for the production of a lightweight ceramic product without the use of so-called stiffening agents.

A further object of this invention is the provision of a heat insulating product having a uniform distribution of cells throughout its entire mass.

A further object of this invention is the provision of a ceramic insulating mass substantially free of any decomposition or discoloration products of combustion of either the clay slip reenforcing or organic fibrous cell-producing means.

A still further object of this invention is to provide an intermediate unfired cellular argillaceous product capable of being handled readily and conveniently previous to firing without substantial distortion.

Further and additional objects will appear from the following description and the appended claims.

It has been found that foam having very tenacious properties and not being readily destructible may be incorporated with a stiff clay mix by suitable methods without the addition of excess water and stiffening agents, as has been necessary in the past. The foam preferably has a high degree of strength and tenacity, so that it may be intermingled and incorporated with the stiff plastic mass of argillaceous material without a substantial destruction of the cellular structure imparted by the foam to the mass. The resulting product may be shaped in any desired manner and dried and fired in accordance with conventional processes. Pressing the mixture, either in molds or by extrusion, is a suitable manner of proceeding to form the articles.

In carrying out this invention in one form, a tenacious uniform foam is intermingled and thoroughly incorporated with a stiff plastic binder, such as a clay body containing water, kaolin, and crushed brick known as "grog." The foam may be incorporated into the plastic mass with any suitable apparatus that is well known to the ceramic art. After the foam is introduced into the clay, the mixture is thoroughly mixed until a uniform product results, which may then be shaped, as by pressing in molds or by extrusion, then being dried and fired in any manner well known in the art. The amount of water to be incorporated with the dry clay and "grog" previous to the addition of the foam may depend upon many factors, such for example as the particular nature of the clay or "grog" employed, the plasticity desired in the resulting clay mass, the type of foam that is to be incorporated therewith, the type of product desired, etc. It is preferable that the plasticity of the clay be such that it may readily be mixed with the tenacious foam, whereby a mixture is produced that is capable of being shaped and formed so that it will not sag or slump preliminary to or during the drying operation.

A foam that has been found suitable for use in accordance with the process of this invention is one which comprises water, a saponin-containing substance such as soap bark, or saponin itself, and a substance such as starch, which will impart strength to the foam bubbles. In accordance with one formula (Formula A) the foam may have the following composition:

| | Per cent |
|---|---|
| Soap bark | 1 |
| Starch | 2 |
| Water | 97 |

The starch may be made into a paste with a little cold water and then gradually added to the remainder of the water in which is dissolved the soap bark. The suspension may be heated to about 190° F. until gelatinization of the starch takes place. The solution upon cooling may be whipped with air by any suitable means and a foam produced having a density of from 10 to 14 pounds per cubic foot. In practice, it is desirable to produce the foam from the above-mentioned solution in any of the well-known foam cells that are available for this purpose. The foam produced in accordance with this formula is suitable for incorporation into the plastic clay bodies which may be employed for the manufacture of the ceramic products in accordance with this invention.

In accordance with another formula (Formula B), the foam may have the following composition:

| | Per cent |
|---|---|
| Soap bark | 1 |
| Modified starch | 3 |
| Water | 96 |

The modified starch, as used herein, is partially dextrinized, containing a high percentage of water-soluble materials. It is described more fully in the copending application, Serial No. 86,346, of T. P. Camp, filed June 12, 1936, now Patent No. 2,207,339. The ingredients in this formula may be compounded in the same manner as described for those of Formula A. While the solution is still warm, it may be passed through a foam cell or other foam forming means to produce a foam having a density of 6 to 8 pounds per cubic foot. This foam is very tenacious and stiff and may be readily incorporated into stiff clay bodies without substantial destruction of the foam.

The foam prepared in accordance with Formula B, because of its extreme lightness and tenacity, is very suitable for incorporation into very stiff clay bodies.

For the preparation of a cellular clay body in accordance with this invention, the following ingredients may be employed:

| | | |
|---|---|---|
| "Grog" | grams | 30 |
| Kaolin | do | 30 |
| Water | do | 40 |
| Foam (Formula A) | cc | 148 |

The water, "grog," and kaolin are mixed and thoroughly incorporated. The "grog" in this particular example may consist of insulating cellular brick crushed to about 30 mesh. The water is thoroughly incorporated by blunging or pugging until the mass becomes plastic. The amount of water employed may be dependent upon the type of "grog" employed and the degree of plasticity desired in the mass. The plastic clay may then be placed in a mixer having suitable blending plates and thoroughly incorporated with the tenacious foam.

If a clay body having a high degree of plasticity is used, it may be desirable to use a foam prepared in accordance with Formula B, given above. The resulting cellularized clay mass may then be molded or pressed to form the desired shape. The resulting product may then be dried and fired in accordance with the usual ceramic processes.

It will be noted that, in the type of ceramic product produced in accordance with this invention, no reenforcing agents such as plaster of Paris, Portland cement, or other hardening material are necessary, although they may be incorporated into the material if desired. The foam produced is sufficiently stiff per se to maintain its position within the cellularized clay body during the drying operation, and it also imparts a certain amount of rigidity thereto. The ceramic products prepared in accordance with the present invention generally have a lower coefficient of shrinkage than those prepared by using the above-indicated reenforcing agents, and consequently such products may require only slight or no trim. A higher percentage of first quality product may thus be formed by the process of this invention.

If a sound as well as heat insulating product is desired, a certain amount of wood fibers, preferably 10 to 30 mesh in size, may be incorporated into the stiff clay mass and thoroughly blended therein. It has been found that 5% by weight of wood fibers incorporated into the mass gives the desired results. However, other percentages may be employed if desired. The use of such fibers results in interconnecting channels in the final fired product between the individual cells produced by the foam and thus assists in making the product more suitable for sound absorption. It has also been found in certain cases that the addition of a small amount of fibers may enhance the distribution of the foam throughout the mass, particularly where a more liquid or mobile clay mass is employed. The fibers, however, are not necessary for holding the foam in uniform distribution in those cases where the plasticity of the clay is sufficient to give a rigidity to the molded product previous to the drying operation.

If the cellularized clay mass is produced from a highly plastic clay material with the use of a very light but highly tenacious foam, such as prepared in accordance with Formula B, it will be observed that a product is formed which, upon drying, will permit the soluble material incorporated within the mass to migrate to the portions of the mass adjacent to the surface. Such soluble materials may be salts of such a nature that they will subsequently form a glaze adjacent to the surface of the insulating material when it is fired in the conventional way. Consequently, an insulating brick having a porous interior and a glazed surface that is integral with the brick itself may be produced. If desired, suitable salts may be incorporated into the clay mass during manufacture in order that this glazing effect might be produced.

It is not contemplated that this invention be restricted to the production of porous ceramic material, such as has been described in the above examples. For example, the foam may be incorporated in a similar manner into stiff plastic masses of Portland cement, calcined gypsum, and magnesium oxychloride masses previous to the setting thereof. In such cases a lightweight cellular product may be produced from a cementitious material without the necessity of incorporating an excess of water into the cement, only that amount of water being used necessary to permit the material to set.

While a particular embodiment of this invention is shown above, it will be understood, of course, that the invention is not to be limited thereto, since many modifications may be made; and it is contemplated, therefore, to cover any such modifications as fall within the true spirit and scope of this invention as defined by the appended claims.

I claim:

1. The process of producing a hardened lightweight composition which comprises incorporating a tenacious stable foam comprising water, starch and saponin with a stiff plastic mass of potentially hardenable material, said mass being incapable of plastic flow under its own weight, molding the resulting mixture under pressure, and hardening the shaped article thus produced.

2. The process of producing a lightweight ceramic product which comprises incorporating a tenacious stable foam comprising water, starch and saponin directly with a stiff plastic mass of argillaceous material, said mass being incapable of plastic flow under its own weight, shaping the resulting mixture, and drying and firing the shaped article thus produced.

3. The process of producing a hardened lightweight composition which comprises incorporating a tenacious stable foam comprising water, starch and saponin with a stiff plastic mass of cementitious material, said mass being incapable of plastic flow under its own weight, molding the resulting mixture under pressure, and effecting the setting and hardening of said cementitious material.

JOSEPH R. PARSONS.